May 16, 1944. E. G. BERG ET AL 2,348,880
BINDER FEEDING ATTACHMENTS FOR MIXING MACHINES
Filed May 4, 1942 3 Sheets-Sheet 1

Inventors
EGON G. BERG
MELVIN OVESTRUD
By Carlsen & Hagle
Attorneys

May 16, 1944.  E. G. BERG ET AL  2,348,880
BINDER FEEDING ATTACHMENTS FOR MIXING MACHINES
Filed May 4, 1942  3 Sheets-Sheet 2
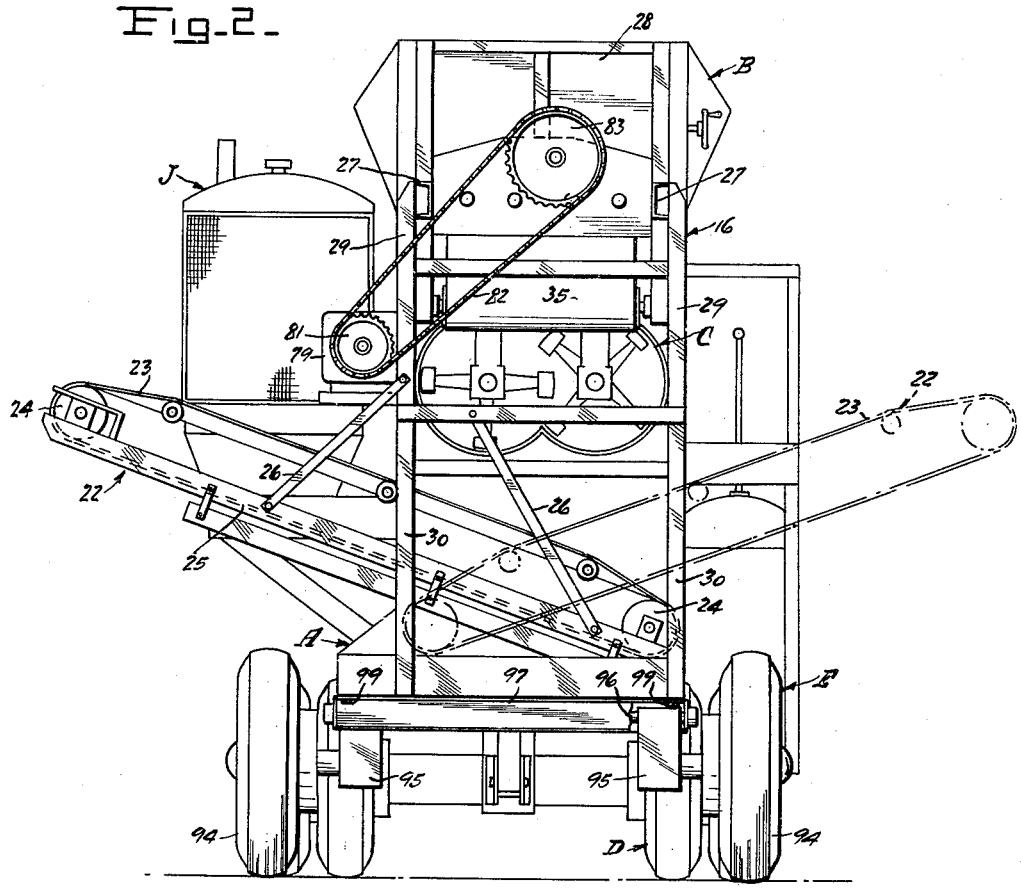
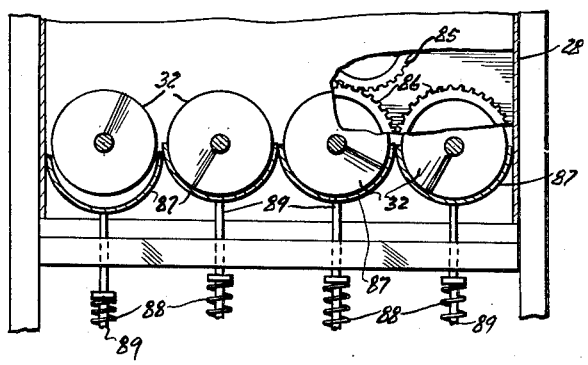
Inventors
EGON G. BERG
MELVIN OUESTRUD
By Carlsen & Hagle
Attorneys Patented May 16, 1944

2,348,880

UNITED STATES PATENT OFFICE 2,348,880

BINDER FEEDING ATTACHMENT FOR MIXING MACHINES

Egon G. Berg and Melvin Ovestrud, Minneapolis Minn., assignors to Pioneer Engineering Works, Inc., Minneapolis, Minn., a corporation of Delaware Application May 4, 1942, Serial No. 441,618

8 Claims. (Cl. 83—93)

This invention relates generally to improvements in machines for mixing road building materials particularly of the kind made up of an aggregate and a clay or soil binder properly blended and mixed.

Our machine basically comprises a portable or wheel borne frame on which is arranged a hopper and a mixing device, and an engine for operating the parts. This machine is adapted to be pulled along the road by a tractor vehicle and to thoroughly and properly mix the material while traveling. Our present invention has as its primary object the provision of suitable feeding means for adding the binding material, whether it is clay or other kind of soil, to the mixing device for mixing therein in proper proportions with the aggregate fed from the hopper and for the preparation of stabilized road materials. Another object is to provide a soil stabilizer feeding mechanism so constructed and arranged that it may be readily attached to, or removed from, the mixing machine and to provide certain novel features in both the attachment and machine facilitating this demountable arrangement.

These and other more detailed and specific objects will be disclosed in the course of the following specification, reference being had to the accompanying drawings, in which—

Fig. 2 is an end elevation.

Fig. 3 is an enlarged fragmentary vertical cross section through the soil feeder showing the feed screws therein.

Figure 1:
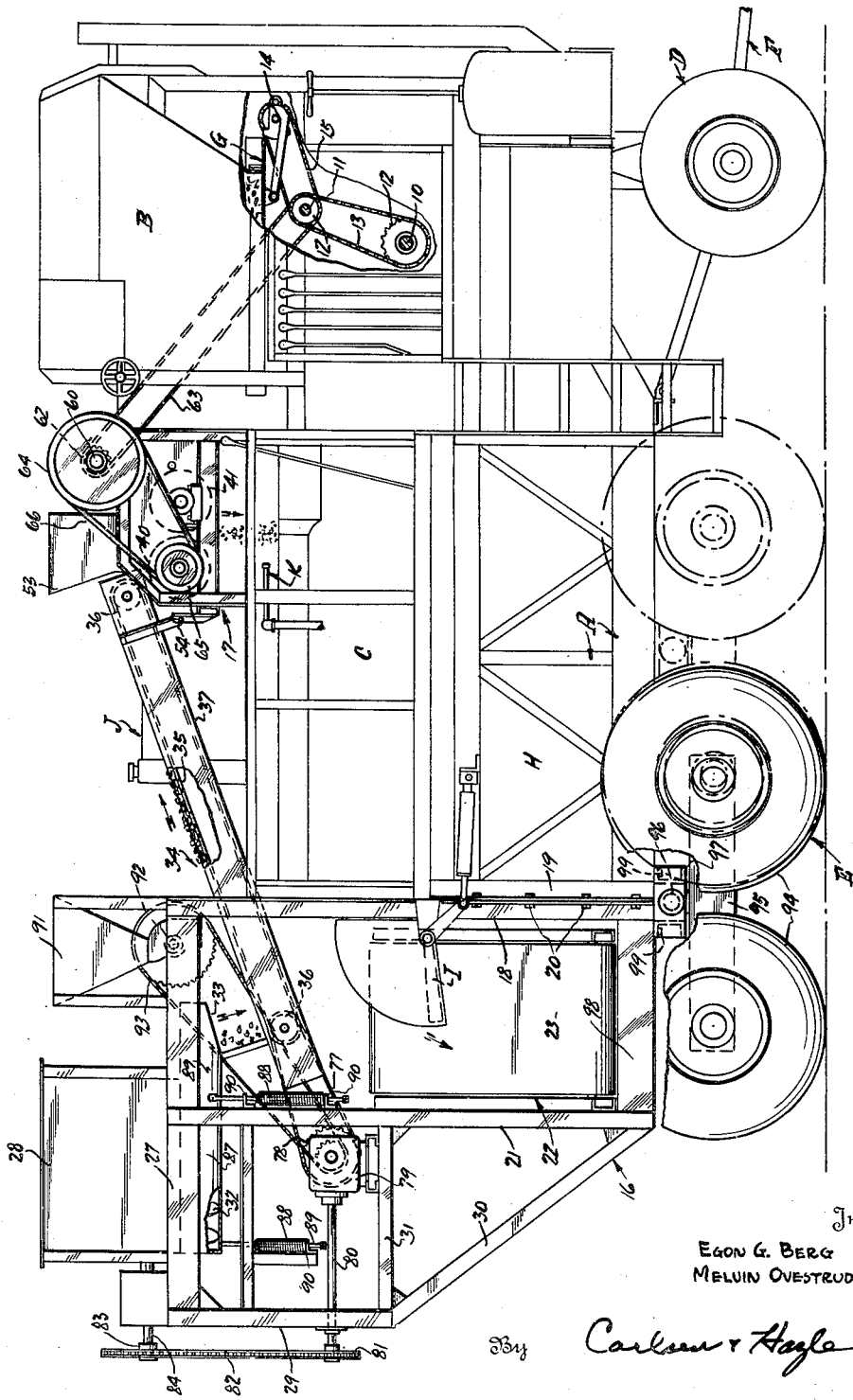
Fig. 1 is a side elevation of a mixing machine and of the soil binder attachment forming our present invention.

The present application is a continuation-in-part from our copending application for patent on a Mixing machine, Serial No. 357,708, filed September 21, 1940 and now United States Patent No. 2,297,867, issued October 6, 1942. Only such parts of the machine as pertinent to the present invention are described in detail herein and reference to the above identified application is invited for a more complete disclosure.

Referring now more particularly and by reference characters to the drawings, A represents generally the frame of the machine which mounts the aggregate hopper B and pug mill or mixing device C as well as other parts for the machine. The frame is supported upon a forward, dirigible wheeled truck D and a rear wheeled truck E, and the machine is pulled along the road or highway by a suitable tractor or tractive vehicle (not shown) connected to the draft tongue F.

In the usual operation of the machine it is employed for mixing an aggregate and a bituminous binder, the aggregate being supplied to hopper B by a traveling loader (not shown) which is connected to the tongue F and picks up the aggregate from a windrow on the road. The aggregate is fed from the hopper then into the pug mill C by a reciprocating stripper plate G and a bituminous binder, received from a tank H in the frame, is sprayed by a suitable pump and spray device (not shown) on the aggregate in the mill. The mixed material is discharged through the open rear end of the mill over a gate I and ordinarily falls back to the road in a windrow ready for spreading and compacting.

For details as to the bituminous binder feed and other mixing details, reference is also invited to our Patent No. 2,297,867 referred to hereinbefore.

A power unit or engine J is mounted on the frame and drives all working parts thereon, the driving mechanism including a main countershaft 10 and secondary countershaft 11 which are pertinent to the present disclosure. Such shafts 10 and 11 are connected by sprockets 12 and chain 13 and the secondary countershaft in turn drives the crank 14 through a chain 15 for reciprocating the feeding or stripper plate G. Obviously the arrangement is thus such that the plate G will be reciprocated at a preselected frequency controlled by the speed of the various shafts and the aggregate feed into the pug mill will be thus carried out at a constant, controlled rate.

To adapt the machine to the mixing of a soil or clay binder with the aggregate and for making so-called stabilized roads we provide an auxiliary framework made up of two main units 16 and 17. The larger unit 16 of this framework is disposed at the rear of the frame and includes forwardly disposed upright members 18 which are arranged flush against the rear uprights 19 of the frame A and removably secured thereto by bolts 20 so that this frame unit forms in effect a rearward extension of the machine frame.

The rear auxiliary frame unit 16 further includes rear upright members 21 which are spaced rearwardly of the members 18 to provide space therebetween for a side delivery conveyor 22 which includes a conveyor belt 23 arranged over rollers 24 in a frame 25 in a conventional manner. Said delivery conveyor 22 is supported by members 26 in the frame with its lower inner end in position to receive the mixed material from the rear end of the pug mill C and with its outer end elevated to discharge such material into a truck or stock pile (not shown). As seen in Fig. 2 the conveyor may be arranged to project from either side of the machine. Control of the rate of discharge of the material from the pug mill onto the delivery conveyor is, of course, carried out by adjustment of the gate I.

Surmounting the upright frame members 18 and 21 and extending rearwardly thereof are top members 27 between which is mounted the binder feed hopper 28. The rear end of the top frame 27 is braced by short uprights 29 and forwardly and downwardly inclined braces 30, and side members 31 are supported horizontally from front to rear between the frame members 21 and 29 beneath the hopper. The feed hopper 28 includes a series of parallel feed screws 32 arranged in its bottom to feed its contents downwardly and forwardly to a discharge 33 which is disposed over the lower, rear end of a feed conveyor 34. This conveyor includes a belt 35 trained over rollers 36 in a frame 37 and extends from a point beneath the feed hopper 28 forwardly and upwardly over the pug mill C.

The frame unit 17 is arranged immediately above the forward or receiving end of the pug mill C and includes upright members 38 which support spaced, horizontally and longitudinally extending side members 39. The shredding mechanism for the binder is arranged in this frame unit and comprises a pair of parallel, transversely extending shredding rolls or rollers 40 and 41 having their axles 42 and 43 journaled in end bearings 44 and 45 upon the side members 39 of the frame. These shredding rolls 40—41 are arranged one behind the other in about the same horizontal plane and the rear roll 40 has a series of radially projecting and longtudinally extending knives or blades 46 while the other, forward, roll 41 has a smooth peripheral surface. The rolls are of course spaced apart slightly to leave a space between them for the passage of the binder as will presently appear. The bearings 45 carrying the axle 43 for the smooth surfaced roll 41 are slidably mounted, as indicated at 47, upon the side members 39 and are normally drawn therealong in a rearward direction, or toward the other roll 40, by coil springs 48. These springs are arranged upon studs 49 extending rigidly from lugs 50 on the bearings 45 and extending slidably and rearwardly through brackets 51 affixed to the members 39, said springs being braced between these brackets and tension adjusting collars 52 adjustably mounted on rear end portions of the studs. The brackets 51 obviously may act as stops to limit movement of the roll 41 toward roll 40 and thereby maintain proper spacing between the two, while the springs will permit yieldable increases of such spacing should rocks or other hard objects fall between the rolls.

The upper and forward end of the feed conveyor 34 is arranged above the rear shredding roll 40 so that the binder carried by said conveyor will fall upon this roll and be carried downwardly between both rolls and into the pug mill C. Side plates 53 secured to the frame 17 prevent lateral escape of the binder. Brackets 54 support this end of the conveyor 34 which thus serves also to rigidly connect and brace the frame units 16—17 together.

A rock conveyor screw 55 is arranged parallel with and forwardly of the shredding roll 41 and has its shaft 56 supported by end brackets 57 which in turn are arranged upon end plates 58 secured to the frame 17 and forming a part of the rock housing 59.

Figure 4:
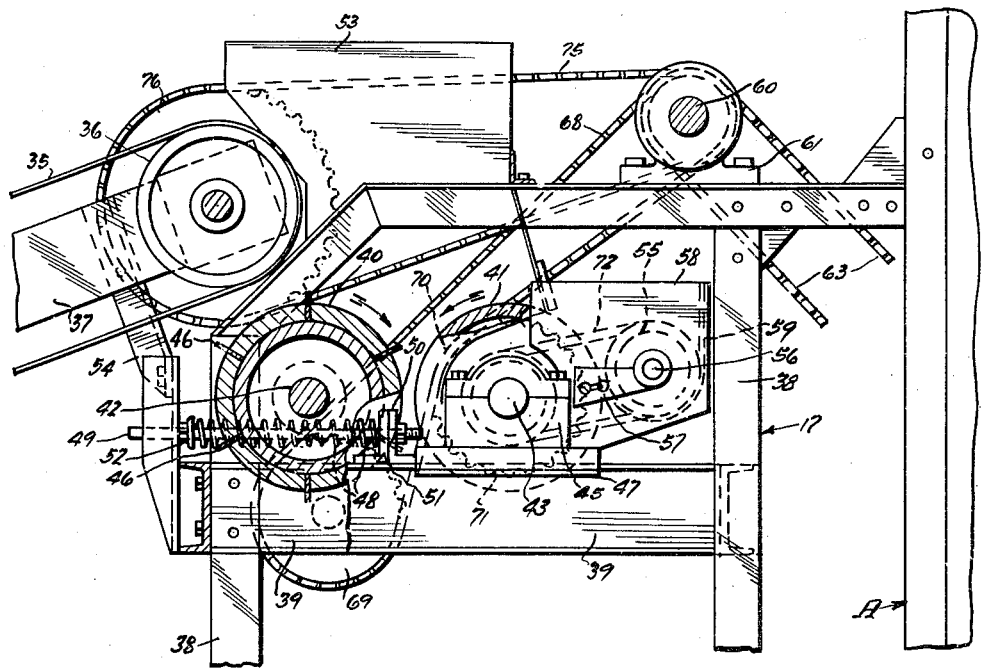
Fig. 4 is an enlarged vertical and longitudinal section through the soil shredding mechanism and adjacent elements, showing certain parts in side elevation.
Figure 5:
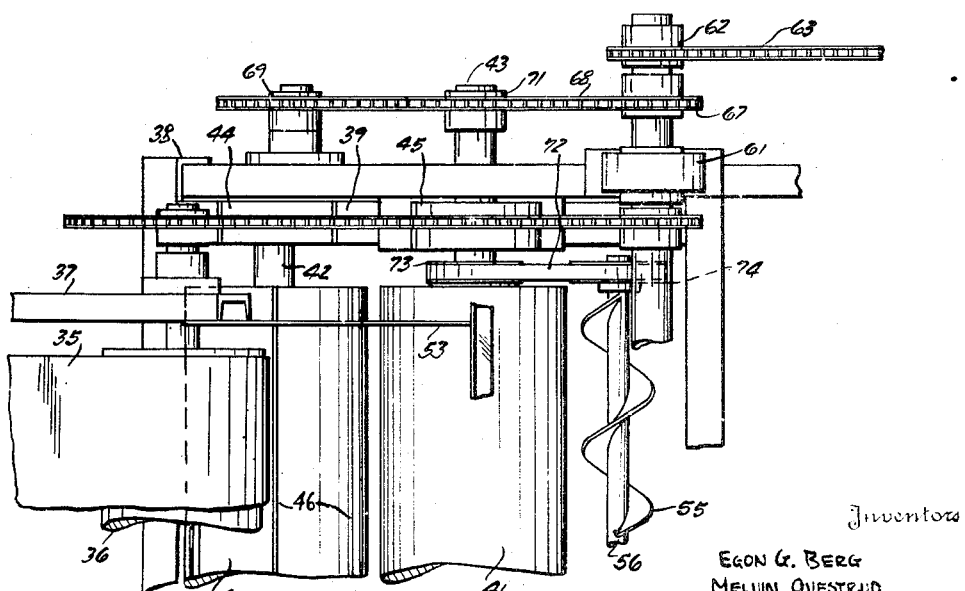
Fig. 5 is a fragmentary plan view of the structure shown in Fig. 4.

To drive the various working parts of the soil binder attachment we provide a main drive shaft 60 which is journaled in bearings 61 secured atop the frame unit 17 and which is connected by sprockets 62 and sprocket chain 63 to the secondary countershaft 11 previously described. At one end this shaft 60 carries a large grooved pulley 64 (Fig. 1) aligned with a smaller grooved pulley 65 secured on the axle 42 of the shredding roll 40 and belts 66 trained over these pulleys will obviously rotate the roll, the rotation being at a fairly high speed and in a clockwise direction as viewed in Fig. 4. Also mounted on the drive shaft 60 is a sprocket 67 over which runs a chain 68 trained at a lower and rearwardly disposed end over an idler sprocket 69 journaled alongside the frame. One span or flight of this chain then runs, as indicated at 70, over a sprocket 71 secured to the axle 43 of the roll 41, this roll being thus rotated not only in a direction opposite to that of roll 40 but also at a much slower speed. A belt 72 trained over pulleys 73—74 on the axle 43 and shaft 56 rotates the rock conveyor screw 55. This completes the driving mechanism for the shredding mechanism itself.

In addition, however, the shaft 60 further carries a sprocket over which is arranged a sprocket chain 75 running over a sprocket 76 on the shaft of the upper or forward conveyor roller 36 to drive the conveyor belt in the desired direction, or forwardly on its upper flight as indicated in Fig. 1. A sprocket on the lower, rear roller 36 is connected by a chain 77 to a sprocket 78 which drives a gear box 79 secured upon the frame side members 41, the driven shaft 80 of this gear box then extending rearwardly and carrying a sprocket 81 over which runs a chain 82 to drive the hopper feed mechanism through a sprocket 83. The shaft 84 of this sprocket 83 carries a gear 85 (Fig. 3) which meshes with one of the gears 86 connecting and rotating the feed screws 32.

A separate trough-like bottom pan 87 is arranged beneath each feed screw 32 and the binder will, of course, be carried endwise along such pans by action of the screws until it is discharged at 33, the speed at which the screws operate determining the rate at which the material is fed from the hopper. The pans 87 are urged upwardly to normal positions beneath the feed screws by coil springs 88 which are arranged over studs 89 depended from the pans and slidably arranged in upright positions in brackets 90 carried by adjacent parts of the frame. The springs obviously will allow yielding downward movements of the pan to clear rocks or the like which might jam beneath the screws as clearly shown to the left in Fig. 3.

In operation the aggregate is fed into the mixing device or pug mill C at a certain and constant rate by action of the stripper plate G and the various parts of the soil binder attachment will also be driven as follows. Rotation of the main drive shaft 60 will rotate the shredding rolls 40 and 41 and operate the feed conveyor 34. At the same time the feed screws 32 will be rotated to feed out the binder material from the hopper 28 onto the conveyor 34 which will then carry the binder upwardly and forwardly dumping it onto the shredding rolls. The action of the differential in speed of these rolls, and of the knives 46 on one, will serve to finely shred the binder and drop it directly down into the receiving end of the mill C wherein it will be commingled with the aggregate and finally discharged onto the delivery conveyor 22. Any rocks or other similar objects which may be in the binder delivered to the shredding rolls will in large part be eliminated by action of the knives 46 on the faster roll 40 which will knock the rocks over forwardly into the housing 59 from which they will be discharged by the rock conveyor screw 55.

Inasmuch as all parts of the soil binder mechanism are operated by the shaft driving the stripper plate G the feeding rate of the binder will be in constant proportion to the feeding rate of the aggregate and proper proportions of the mixture may be held to a fine degree. The relative proportions of both aggregate and binder may of course be predetermined by the initial selection of the ratio between the various driving sprockets.

Water may be added to the mixture in the mill by a spray manifold K (Fig. 1) supplied in any suitable manner.

To retain proper moisture conditions in the material as it is being mixed we provide a hopper 91 arranged on the frame unit 16 over the feed conveyor 34 and feeding mechanism 92 therein may be driven by a sprocket chain 93 from the gear box 79 as clearly shown in Fig. 1. Calcium chloride is placed in this hopper then and is fed therefrom onto the binder as it is being carried toward the shredder on the conveyor 34, said chemical having the desired effect and being, as will be apparent, fed at a constant rate onto the binder.

A novel feature of the machine making possible the effective rearward extension of the frame (by frame unit 16) to carry the soil binder feeding mechanism consists in the mounting of the rear wheeled truck E. This truck comprises front and rear tandem wheels 94 at each side arranged at the ends of bolsters 95 which are fulcrumed intermediate their ends by pins 96 arranged in a cross member 97. The respective front and rear wheels at each side may thus move upwardly or downwardly as required in leveling the machine.

When the machine is used without the soil binder feeding attachment of the preesnt invention the rear truck E is arranged forwardly of the rear end of the frame A as represented in broken lines in Fig. 1. However the attachment of the frame 16 and all of the parts supported thereon will greatly unbalance the machine and to counteract this we move the cross member 97 rearwardly and refasten it to the frame A and the lower members 98 of the frame 16 at a point about in line with the rear of the frame A thus so placing the truck that it will properly support the added rear end weight. The cross member 97 is provided with bolts 99 for making the connection to the frame at either mounting point.

It is understood that suitable modifications may be made in the structure as disclosed, provided such modifications come within the spirit and scope of the appended claims. Having now therefore fully illustrated and described our invention, what we claim to be new and desire to protect by Letters Patent is:

1. The combination with a machine for mixing road building materials including an aggregate hopper and a mixing device, of a mechanism for feeding a soil binder to the mixing device for preparing materials for stabilized roads, said soil binder feeding mechanism including separate main frame units removably connected to the machine, a binder hopper and feeding means upon one frame unit, a binder shredding mechanism on the other frame unit, and a conveyor device operatively arranged to carry the binder from the feeding means to the shredding mechanism.

2. The combination with a machine for mixing road building materials including an aggregate hopper and a mixing device, of a mechanism for feeding a soil binder to the mixing device for preparing materials for stabilized roads, said soil binder feeding mechanism including separate main frame units removably connected to the machine, a binder hopper and feeding means upon one frame unit, a binder shredding mechanism on the other frame unit, a conveyor operatively arranged to carry the binder from the feeding means to the shredding mechanism, and said frame unit carrying the soil shredding mechanism being supported over the mixing device.

3. The combination with a machine for mixing road building materials including an aggregate and a binder, said machine having a mixing device and means for feeding the aggregate thereinto, of a mechanism for feeding a soil binder into the mixing device for preparing stabilized road materials, said mechanism including a pair of frame units detachably connected to the machine, one of said frame units being arranged at the rear of the machine, a hopper for receiving and feeding out the binding material supported on this frame unit, the other frame unit being supported over the mixing device, means on this frame unit for shredding the binding material and feeding it into the mixing device, and means extending between the frame units for carrying the binding material from the hopper to the shredding means.

4. The combination with a machine for mixing road building materials including an aggregate and a binder, said machine having a mixing device and means for feeding the aggregate thereinto, of a mechanism for feeding a soil binder into the mixing device for preparing stabilized road materials, said mechanism including a pair of frame units demountably connected to the machine, one of said frame units being arranged at the rear of the machine, a hopper for receiving and feeding out the binding material supported on this frame unit, the other frame unit being supported over the mixing device, means on this frame unit for shredding the binding material and feeding it into the mixing device, and a conveyor extending between and connecting the frame units, said conveyor being adapted to carry the binding material from the hopper to the shredding means.

5. In a machine for mixing road material composed of an aggregate and a binder and including a traveling frame supported by front and rear wheeled trucks, a mechanism for supplying a soil binder to the machine and including a framework removably supported from the rear of the machine, and said rear truck being movable from a relatively forward position to a rearwardly located position beneath the machine when said framework is attached thereto and to thereby support the added rear end weight of said framework.

6. In a machine for mixing road materials composed of an aggregate and a binder and including a traveling frame supported by front and rear wheeled trucks, a mechanism for supplying a soil binder to the machine and including a frame-work removably supported at the rear end of the machine frame and projecting rearwardly therefrom, said rear wheeled truck including mounting means removably connected to the underside of the machine frame and adjustable from a normal position forwardly of the rear end of the frame to a rear position substantially beneath said framework to support the added rear end weight of the machine when said framework is added thereto.

7. The combination in a machine for mixing road building materials including a mixing device and an aggregate feeder and power operated means for feeding aggregate into said device at a controlled rate, of a mechanism for adding a soil binder to the aggregate in the mixing device and including frame units connected to the machine, a binder hopper and feeding means on one frame unit, a binder shredding means on the other frame unit, a conveyor device arranged to carry the binder from the feeding means to the shredding means, and said feeding means being operatively connected to and actuated by the power operated means for feeding the aggregate to operate in synchronism therewith and feed the binder at a rate proportional to the feeding rate of the aggregate.

8. The combination in a machine for mixing road building materials including a mixing device and an aggregate feeder and power operated means for feeding aggregate into said device at a controlled rate, of a mechanism for adding a soil binder to the aggregate in the mixing device and including separate main frame units demountably connected to the machine, a binder hopper and feeding means on one frame unit, a binder shredding means on the other frame unit, a conveyor device arranged to carry the binder from the feeding means to the shredding means, the second frame unit being arranged over the mixing device, and means operatively connecting the conveyor device to the binder feeding means and to the power operated means for actuating the aggregate feeder whereby the binder will be fed to the mixing device at a rate proportional to the feed of the aggregate thereto.

EGON G. BERG.
MELVIN OVESTRUD.